(12) United States Patent
Fukuda (10) Patent No.: US 10,947,700 B2
(45) Date of Patent: Mar. 16, 2021

(54) HYDRAULIC SYSTEM FOR WORKING MACHINE

(71) Applicant: KUBOTA CORPORATION, Osaka (JP)

(72) Inventor: Yuji Fukuda, Osaka (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 16/448,551

(22) Filed: Jun. 21, 2019

(65) Prior Publication Data

US 2020/0002918 A1    Jan. 2, 2020

(30) Foreign Application Priority Data

Jun. 27, 2018  (JP) ............................. JP2018-122400
Nov. 14, 2018  (JP) ........................... JP2018-0214076

(51) Int. Cl.
| | | |
|---|---|---|
| *E02F 9/22* | (2006.01) |
| *F15B 20/00* | (2006.01) |
| *E02F 9/20* | (2006.01) |
| *F16K 11/22* | (2006.01) |
| *F16K 31/12* | (2006.01) |
| *F16K 1/30* | (2006.01) |

(52) U.S. Cl.
CPC .......... *E02F 9/2203* (2013.01); *E02F 9/2004* (2013.01); *F15B 20/00* (2013.01); *F16K 1/308* (2013.01); *F16K 11/22* (2013.01); *F16K 31/12* (2013.01)

(58) Field of Classification Search
CPC ..... E02F 9/2225; E02F 9/2285; E02F 9/2203; F15B 2211/30525; F15B 2211/3105; F15B 2211/3122; F15B 2211/3133; F15B 2211/31511
See application file for complete search history.

(56) References Cited

U.S. PATENT DOCUMENTS

2017/0175779 A1*  6/2017  Fukuda .................. F15B 11/16

FOREIGN PATENT DOCUMENTS

JP        2010270527        12/2010

* cited by examiner

*Primary Examiner* — Abiy Teka
(74) *Attorney, Agent, or Firm* — Greenblum & Bernstein, P.L.C.

(57) ABSTRACT

A hydraulic system includes a hydraulic pump, a first hydraulic actuator, a second hydraulic actuator, a first control valve to control the first hydraulic actuator, a second control valve to control the second hydraulic actuator, a return fluid tube in which a return fluid discharged from the first hydraulic actuator flows, the return fluid tube connecting the first control valve and the first hydraulic actuator, a first inner fluid tube provided in the first control valve and connected to the return fluid tube, an outer fluid tube connected to the first inner fluid tube, the outer fluid tube connecting the first control valve and the second control valve, a return-discharge fluid tube to discharge the return fluid, the discharge fluid tube being branched from the outer fluid tube, and a throttle provided in the return-discharge fluid tube.

9 Claims, 8 Drawing Sheets

HYDRAULIC SYSTEM FOR WORKING MACHINE

CROSS-REFERENCE TO RELATED APPLICATIONS

The present application claims priority under 35 U.S.C. § 119 to Japanese Patent Application No. 2018-122400, filed Jun. 27, 2018 and to Japanese Patent Application No. 2018-214076, filed Nov. 14, 2018. The contents of these applications are incorporated herein by reference in their entirety.

BACKGROUND OF THE INVENTION

Field of the Invention

The present invention relates to a hydraulic system for a working machine such as a skid steer loader and a compact truck loader.

Description of Related Art

A hydraulic system for a working machine disclosed in Japanese Unexamined Patent Application Publication No. 2010-270527 is previously known. The working machine disclosed in Japanese Unexamined Patent Application Publication No. 2010-270527 includes a boom, a bucket, a boom cylinder to operate the boom, a bucket cylinder to operate the bucket, an auxiliary actuator to operate the auxiliary attachment, and a first control valve to control the stretching and shortening of the boom cylinder, a second control valve to control the stretching and shortening of the bucket cylinder, and a third control valve to operate the auxiliary actuator.

SUMMARY OF THE INVENTION

A hydraulic system for a working machine, includes a hydraulic pump to output an operation fluid, a first hydraulic actuator, a second hydraulic actuator, a first control valve to control the first hydraulic actuator, a second control valve to control the second hydraulic actuator, the second control valve being arranged on a downstream side of the first control valve, a return fluid tube in which a return fluid discharged from the first hydraulic actuator flows, the return fluid tube connecting the first control valve and the first hydraulic actuator, a first inner fluid tube provided in the first control valve and connected to the return fluid tube, an outer fluid tube connected to the first inner fluid tube, the outer fluid tube connecting the first control valve and the second control valve. The hydraulic system includes a return-discharge fluid tube to discharge the return fluid, the return-discharge fluid tube being branched from the outer fluid tube, and a throttle provided in the return-discharge fluid tube.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described below with reference to the drawings as appropriate.

Hereinafter, an embodiment of a hydraulic system for a working machine and the working machine having the hydraulic system of the present invention will be described with reference to the drawings.

First Embodiment

First, the working machine will be described below.

Figure 5:
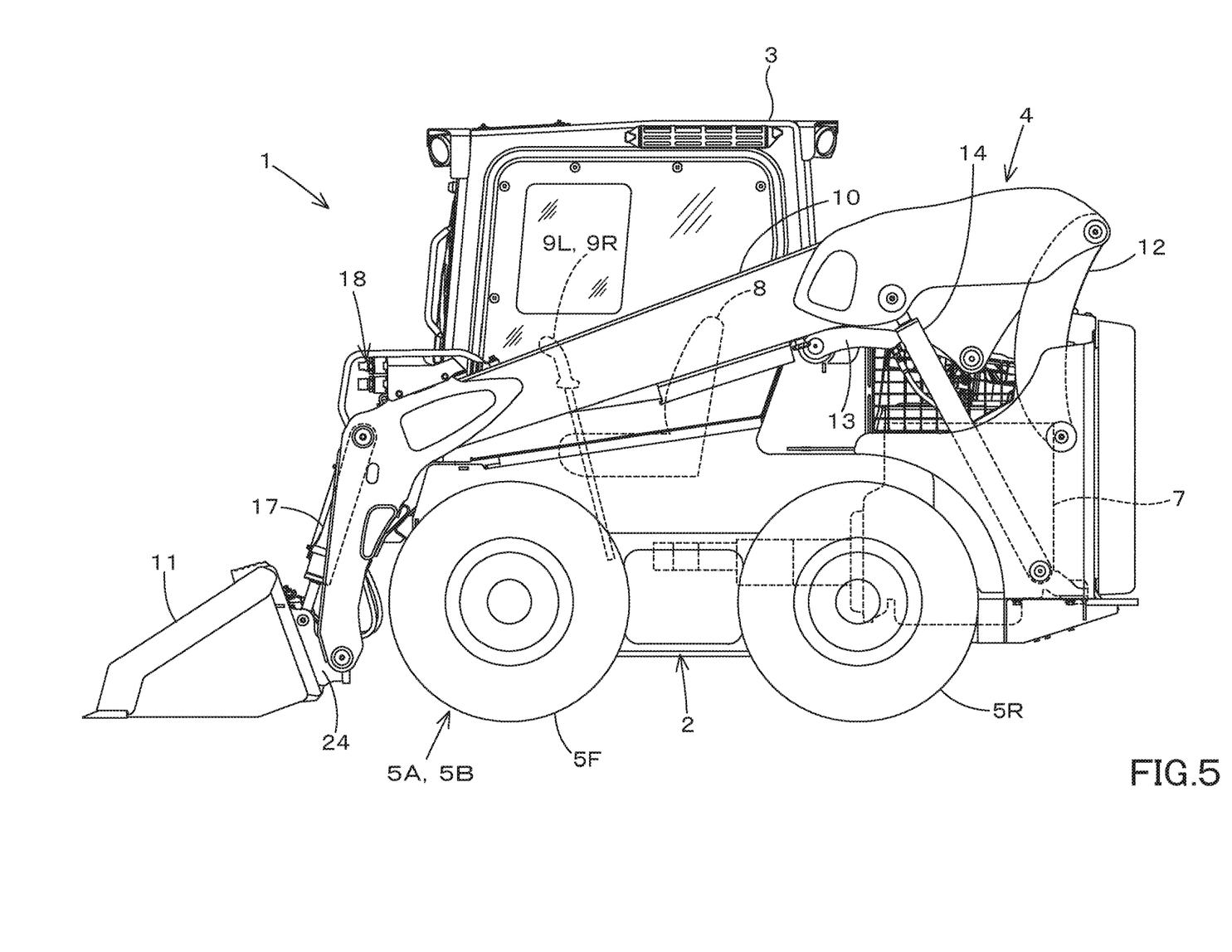
FIG. 5 is a whole view of a skid steer loader exemplified as a working machine.

FIG. 5 shows a side view of a working machine according to a first embodiment of the present invention. In FIG. 5, a skid steer loader is shown as an example of the working machine. However, the working machine according to the present invention is not limited to the skid steer loader. And, the working machine may be, for example, another type of loader working machine such as a compact track loader. In addition, a working machine other than the loader working machine may be employed.

The working machine 1 includes a machine body (a vehicle body) 2, a cabin 3, a working device 4, a traveling device 5A, and a traveling device 5B.

A cabin 3 is mounted on the machine body 2. An operator seat 8 is provided at the rear portion inside the cabin 3. In the embodiment of the present invention, the front side of the operator seated on the operator seat 8 of the working machine 1 is referred to as the front (the left side in FIG. 5), the rear side of the operator is referred to as the rear (the right side in FIG. 5), the left side of the operator is referred to as the left (the front surface side of FIG. 5), and the right side of the operator is referred to as the right (the back surface side of FIG. 5).

In addition, the horizontal direction which is a direction orthogonal to the front-to-rear direction is referred to as a machine width direction. A direction from the central portion of the machine body 2 to the right portion is referred to as a machine outward direction. Another direction from the central portion of the machine body 2 to the left portion is also referred to as the machine outward direction.

In other words, the machine outward direction is equivalent to the machine width direction, and is the direction separating away from the vehicle body 2. A direction opposite to the machine outward direction is referred to as a machine inward direction. In other words, the machine inward direction is equivalent to the machine width direction, and is the direction approaching the vehicle body 2.

The cabin 3 is mounted on the machine body 2. The working device 4 is a device for performing the working, and is arranged on the machine body 2. The traveling device 5A is a device for moving the vehicle body 2, and is provided on the left side of the vehicle body 2. The traveling device 5B is a device for moving the vehicle body 2, and is provided on the right side of the vehicle body 2.

At the rear portion of the machine body 2, a prime mover 7 is provided. The prime mover 7 is a diesel engine (an engine). The prime mover 7 is not limited to the engine, and may be an electric motor or the like.

On the left side of the operator seat 8, a travel lever 9L is provided. On the right side of the operator seat 8, a travel lever 9R is provided. The travel lever 9L arranged on the left side is used for operating the traveling device 5A arranged on the left side, and the travel lever 9R arranged on the right side is used for operating the traveling device 5B arranged on the right side.

The working device 4 includes a boom 10, a bucket 11, a lift link 12, a control link 13, a boom cylinder body 14, and a bucket cylinder 17. The boom 10 is provided on the side of the machine body 2. The bucket 11 is provided at the tip end (the front end) of the boom 10.

The lift link 12 and the control link 13 support the base portion (the rear portion) of the boom 10. The boom cylinder body 14 moves the boom 10 upward or downward.

In particular, the lift link 12, the control link 13, and the boom cylinder body 14 are provided on the side of the machine body 2. The upper portion of the lift link 12 is pivotally supported at the upper portion of the base portion of the boom 10. The lower portion of the lift link 12 is pivotally supported on the side of the rear portion of the machine body 2.

The control link 13 is arranged in front of the lift link 12. One end of the control link 13 is pivotally supported by the lower portion of the base portion of the boom 10, and the other end is pivotally supported by the machine body 2.

The boom cylinder body 14 is a hydraulic cylinder configured to move the boom 10 upward and downward. The upper portion of the boom cylinder body 14 is pivotally supported on the front portion of the base portion of the boom 10. The lower portion of the boom cylinder body 14 is pivotally supported on the side of the rear portion of the machine body 2.

When the boom cylinder body 14 is stretched and shortened, the boom 10 is swung upward and downward by the lift link 12 and the control link 13. The bucket cylinder 17 is a hydraulic cylinder configured to swing the bucket 11. The bucket cylinder 17 couples between the left portion of the bucket 11 and the boom 10 arranged on the left, and couples between the right portion of the bucket 11 and the boom 10 arranged on the right side.

In addition, in place of the bucket 11, an auxiliary attachment such as a hydraulic crusher, a hydraulic breaker, an angle broom, an auger, a pallet fork, a sweeper, a mower, or a snow blower can be attached to the tip end (the front portion) of the boom 10.

In the present embodiment, the traveling devices 5A and 5B are the wheel traveling devices each of which has a front wheel 5F and a rear wheel 5R. Note that the crawler type (including the semi crawler type) traveling devices may be adopted to the traveling devices 5A and 5B.

Next, a hydraulic circuit for working (a working hydraulic system) provided in the skid steer loader 1 will be described below.

Figure 1:
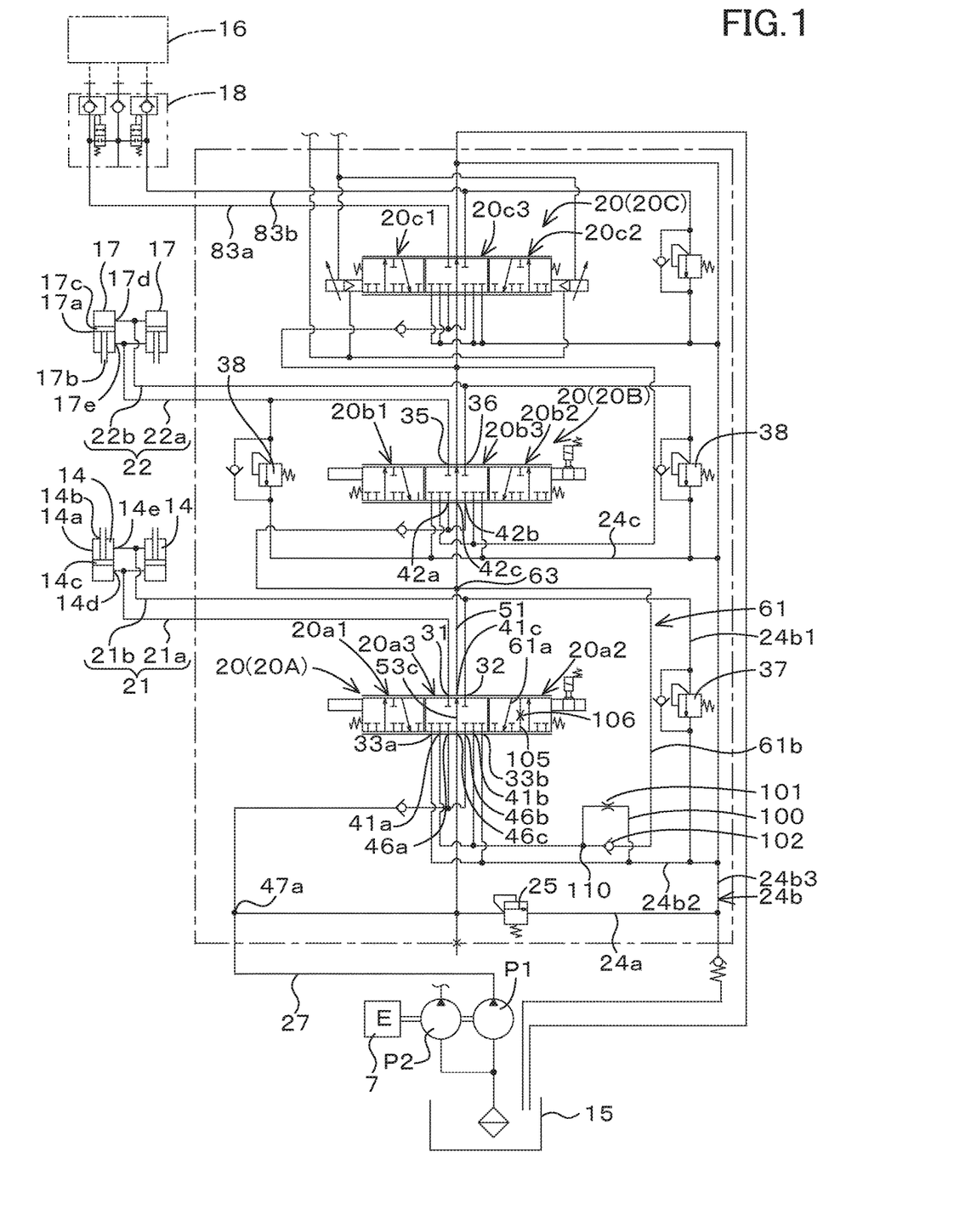
FIG. 1 is a view illustrating a hydraulic system (a hydraulic circuit) according to a first embodiment of the present invention.

The working hydraulic system is a system for operating the boom 10, the bucket 11, the auxiliary attachment, and includes a plurality of control valves 20 and a hydraulic pump for working (a first hydraulic pump) P1 as shown in FIG. 1. In addition, the working hydraulic system includes a second hydraulic pump P2 different from the first hydraulic pump P1.

The first hydraulic pump P1 is a pump to be operated by the power of the prime mover 7, and is constituted of a fixed displacement gear pump. The first hydraulic pump P1 is configured to output the operation fluid stored in the tank (the operation fluid tank) 15.

The second hydraulic pump P2 is a pump to be operated by the power of the prime mover 7, and is constituted of a fixed displacement gear pump. The second hydraulic pump P2 is configured to output the operation fluid stored in the tank (the operation fluid tank) 15.

In the hydraulic system, the second hydraulic pump P2 outputs the operation fluid for signals and the operation fluid for control. The operation fluid for signal and the operation fluid for control are referred to as a pilot fluid.

The plurality of control valves 20 are valves configured to control various types of hydraulic actuators provided in the working machine 1. The hydraulic actuator is a device to be operated by the operation fluid, such as a hydraulic cylinder, a hydraulic motor, or the like. In the embodiment, the plurality of control valves 20 include a boom control valve 20A, a bucket control valve 20B, and a auxiliary control valve 20C.

The boom control valve 20A is a valve configured to control a hydraulic actuator (a boom cylinder) 14 to operate the boom 10. The boom control valve 20A is constituted of a direct-acting three-position switching valve of spool type.

The boom control valve 20A is switched between a neutral position $20a3$, a first position $20a1$ other than the neutral position $20a3$, and a second position $20a2$ other than the neutral position $20a3$ and the first position $20a1$.

In the boom control valve 20A, the switching between the neutral position $20a3$, the first position $20a1$, and the second position $20a2$ is conducted by operating the operation member to move the spool.

The boom control valve 20A is switched by directly moving the spool through the manual operation of the operation member. However, the spool may be moved by the hydraulic operation (the hydraulic operation by a pilot valve, the hydraulic operation by a proportional valve), may be moved by the electrical operation (the electrical operation by magnetization of a solenoid), and may be moved by other methods.

The boom control valve 20A is coupled to the first hydraulic pump P1 by an output fluid tube 27. A discharge fluid tube 24a connected to the operation fluid tank 15 is connected to the output fluid tube 27 in the section between the boom control valve 20A and the first hydraulic pump P1. A relief valve (a main relief valve) 25 is provided in the middle portion of the discharge fluid tube 24a.

The operation fluid outputted from the first hydraulic pump P1 flows through the output fluid tube 27 and then is supplied to the boom control valve 20A. In addition, the boom control valve 20A and the boom cylinder body 14 are connected by a fluid tube 21.

In particular, the boom cylinder body 14 includes a cylinder body 14a, a rod 14 b provided movably in the cylinder body 14a, and a piston 14c provided on the rod 14b. A first port 14d for supplying and discharging the operation fluid is provided at the base end portion of the cylinder body 14a (on a side opposite to the rod 14b). A second port 14e for supplying and discharging the operation fluid is provided at the tip end (the rod 14b side) of the cylindrical body 14a.

The fluid tube 21 includes a first connecting fluid tube 21a connecting the first port 31 of the boom control valve 20A and the first port 14d of the boom cylinder body 14, and a second connecting fluid tube 21b connecting the second port 32 of the boom control valve 20A and the second port 14e of the boom cylinder body 14.

Thus, when the boom control valve 20A is set to the first position 20a1, the operation fluid can be supplied from the first connecting fluid tube 21a to the first port 14d of the boom cylinder body 14, and the operation fluid can be discharged from the second port 14e of the boom cylinder body 14 to the second connecting fluid tube 21b. In this manner, the boom cylinder body 14 is stretched and the boom 10 is moved upward.

When the boom control valve 20A is set to the second position 20a2, the operation fluid can be supplied from the second connecting fluid tube 21b to the second port 14e of the boom cylinder body 14, and the operation fluid can be discharged from the first port 14d of the boom cylinder body 14 to the connecting fluid tube 21a. In this manner, the boom cylinder body 14 is shortened and the boom 10 is moved downward.

The bucket control valve 20B is a valve configured to control a hydraulic cylinder (a bucket cylinder) 17 for controlling the bucket 11. The bucket control valve 20B is constituted of a direct-acting spool three-position switching valve of pilot type. The bucket control valve 20B is switched between a neutral position 20b3, a first position 20b1 other than the neutral position 20b3, and a second position 20b2 other than the neutral position 20b3 and the first position 20b1.

In the bucket control valve 20B, the switching between the neutral position 20b3, the first position 20b1, and the second position 20b2 is conducted by operating the operation member to move the spool.

The switching of the bucket control valve 20B is performed by directly moving the spool by the manual operation of the operation member. However, the spool may be moved by the hydraulic operation (the hydraulic operation by pilot valve and the hydraulic operation by proportional valve), may be moved by the electrical operation (the electrical operation by magnetizing a solenoid), or may be moved in other methods.

The bucket control valve 20B and the bucket cylinder 17 are connected by a fluid tube 22. In particular, the bucket cylinder 17 includes a cylinder body 17a, a rod 17b provided movably in the cylinder body 17a, and a piston 17c provided on the rod 17b.

A first port 17d for supplying and discharging the operation fluid is provided at the base end portion of the cylinder body 17a (on a side opposite to the rod 17b). A second port 14e for supplying and discharging the operation fluid is provided at the tip end (the rod 17b side) of the cylindrical body 17a.

The fluid tube 22 includes a first connecting fluid tube 22a connecting the first port 35 of the bucket control valve 20B and the second port 17e of the bucket cylinder 17, and includes a second supply tube 22b connecting the second port 36 of the bucket control valve 20B and the first port 17d of the bucket cylinder 17.

Thus, when the bucket control valve 20B is set to the first position 20b1, the operation fluid can be supplied from the first connecting fluid tube 22a to the second port 17e of the bucket cylinder 17, and the operation fluid can be discharged from the first port 17d of the bucket cylinder 17 to the second supply tube 22b. In this manner, the bucket cylinder 17 is shortened, and thus the bucket 11 performs the shoveling operation.

When the bucket control valve 20B is set to the second position 20a2, the operation fluid can be supplied from the second supply tube 22b to the first port 17d of the bucket cylinder 17, and the operation fluid can be discharged from the second port 17e of the bucket cylinder 17 to the first connecting fluid tube 22a. In this manner, the bucket cylinder 17 is stretched, and thus the bucket 11 performs the dumping operation.

A discharge fluid tube 24c is connected to the first connecting fluid tube 22a and the second connecting fluid tube 22b, and a relief valve 38 is provided in the discharge fluid tube 24c. The set pressure of the relief valve 38 is set to be higher than the set pressure of the main relief valve 25, for example.

In addition, the hydraulic actuator on the upstream side may be made easy to be operate by setting the set pressure of the relief valve 38 to be lower than the set pressure of the main relief valve 25.

The auxiliary control valve 20C is a valve configured to control the hydraulic actuator (the hydraulic cylinder, the hydraulic motor, and the like) 16 mounted on the auxiliary attachment. The auxiliary control valve 20C is constituted of a direct-acting spool three-position switching valve of pilot-type.

The auxiliary control valve 20C is switched between a neutral position 20c3, a first position 20c1 other than the neutral position 20c3, and a second position 20c2 other than the neutral position 20c3 and the first position 20c1.

In the auxiliary control valve 20C, the switching between the neutral position 20c3, the first position 20c1, and the second position 20c2 is performed by moving the spool with use of the pressure of the pilot fluid. The connecting member 18 is connected to the auxiliary control valve 20C through the supplying-discharging fluid tubes 83a and 83b.

The connecting member 18 is connected to a fluid tube connected to the hydraulic actuator (the auxiliary hydraulic actuator) 16 of the auxiliary attachment.

Thus, when the auxiliary control valve 20C is set to the first position 20b1, the operation fluid can be supplied from the supplying-discharging fluid tube 83a to the hydraulic actuator 16 of the auxiliary attachment. When the auxiliary control valve 20C is set to the second position 20c2, the operation fluid can be supplied from the supplying-discharging fluid tube 83b to the hydraulic actuator 16 of the auxiliary attachment.

As described above, the hydraulic actuator 16 (the auxiliary attachment) can be operated by the operation fluid supplied from the supplying-discharging fluid tube 83a or the supplying-discharging fluid tube 83b to the hydraulic actuator 16.

Then, in the hydraulic system, a series circuit (a series fluid circuit) is employed. In the series circuit, the operation fluid returned from the hydraulic actuator to the control valve arranged on the upstream side can be supplied to the control valve arranged on the downstream side.

For example, focusing on the boom control valve 20A and the bucket control valve 20B, the boom control valve 20A is a control valve arranged on the upstream side, and the bucket control valve 20B is a control valve arranged on the downstream side.

Hereinafter, the control valve arranged on the upstream side is referred to as a "first control valve", and the control valve arranged on the downstream side is referred to as a "second control valve". In addition, a hydraulic actuator corresponding to the first control valve is referred to as a "first hydraulic actuator", and a hydraulic actuator corresponding to the second control valve is referred to as a "second hydraulic actuator".

The fluid tube for supplying, to the second control valve, the return fluid that is the operation fluid returning from the first hydraulic actuator to the first control valve is referred to as the "first fluid tube".

In the embodiment, the boom control valve 20A is the "first control valve", and the bucket control valve 20B is the "second control valve". In addition, the boom cylinder body 14 is the "first hydraulic actuator", and the bucket cylinder 17 is the "second hydraulic actuator".

The first control valve and the second control valve will be described in detail below.

An output portion of the first control valve 20A and an output portion of the first hydraulic pump P1 are connected by an output fluid tube 27. The output fluid tube 27 is branched at a middle portion 47a. The branched fluid tube of the output fluid tube 27 is connected to the first input port 46a and the second input port 46b of the first control valve 20A. In addition, the output fluid tube 27 is connected to the third input port 46c of the first control valve 20A.

Thus, the operation fluid outputted from the first hydraulic pump P1 can be supplied into the first control valve 20A through the output fluid tube 27, the first input port 46a, the second input port 46b, and the third input port 46c.

The first control valve 20A and the second control valve 20B are connected by a central fluid tube 51. The central fluid tube 51 connects the third output port 41c of the first control valve 20A and the third input port 42c of the second control valve 20B.

The first control valve 20A and the second control valve 20B are connected by a first fluid tube 61 in addition to the central fluid tube 51. The first fluid tube 61 is a fluid tube for supplying, to the second control valve 20B through the first control valve 20A, the return fluid returning from the first hydraulic actuator 14 to the first control valve 20A.

The first fluid tube 61 includes a first connecting fluid tube (a first return fluid tube) 21a, a first internal fluid tube 61a, and an external fluid tube 61b. The first connecting fluid tube 21a is a fluid tube connecting the first port 31 of the first control valve 20A and the first port 14d of the first hydraulic actuator 14, and is a first return fluid tube in which the return fluid discharged from the first port 14d of the first hydraulic actuator 14 flows.

In addition, the second connecting fluid tube (the second return fluid tube) 21b different from the first connecting fluid tube 21a is a fluid tube connecting the second port 32 of the first control valve 20A and the second port 14e of the first hydraulic actuator 14. And, the second connecting fluid tube 21b is the second return fluid tube in which the return fluid discharged from the second port 14e flows.

The second return fluid tube 21b is connected to the discharge fluid tube 24b. The discharge fluid tube 24b includes a fluid tube 24b1 connected to the second connecting fluid tube 21b, a fluid tube 24b2 connected to the first discharge port 33a and the second discharge port 33b of the first control valve 20A, and a fluid tube 24b3 connecting the operation fluid tank 15 and a confluent portion between the fluid tube 24b1 and the fluid tube 24b2.

A relief valve 37 is provided in the middle of the fluid tube 24b1. The set pressure of the relief valve 37 is set to be higher than the set pressure of the main relief valve 25, for example.

In addition, the first hydraulic actuator 14 may be made easy to be operate by setting the set pressure of the relief valve 37 to be lower than the set pressure of the main relief valve 25.

The first internal fluid tube 61a is a fluid tube provided in the first control valve 20A and in communication with the first return fluid tube 21a.

In particular, the first internal fluid tube 61a is a fluid tube to connect the first port 31 of the first control valve 20A and the first output port 41a of the first control valve 20A when the first control valve 20A is set to the second position 20a2.

The external fluid tube 61b is a fluid tube that is communicated with the first internal fluid tube 61a, and is connected to the second control valve 20B. The external fluid tube 61b connects the first output port 41a of the first control valve 20A and the first input port 42a of the second control valve 20B, and connects the second output port 41b of the first control valve 20A and the second input port 42b of the control valve 20B.

The middle portion of the external fluid tube 61b is connected to the central fluid tube 53c.

According to the configuration described above, when the first control valve 20A is set to the second position 20a2 which is a side position, the first connecting fluid tube (the first return fluid tube) 21a, the first internal fluid tube 61a, and the external fluid tube 61b are connected, and thereby the return fluid returning from the first hydraulic actuator 14 to the first control valve 20A can be supplied to the second control valve 20B through the first return fluid tube 21a, the first internal fluid tube 61a, and the external fluid tube 61b.

The working hydraulic system is configured to discharge the return fluid passing through the external fluid tube 61b. The working hydraulic system includes a return-discharge fluid tube 100. The return-discharge fluid tube 100 is a fluid tube provided on the downstream side of the spool of the first control valve 20A. The return-discharge fluid tube 100 is branched from the external fluid tube 61b and discharges the return fluid to the discharging portion, the return fluid passing through the external fluid tube 61b.

In particular, one end of the return-discharge fluid tube 100 is connected to the external fluid tube 61b, and the other end is connected to the discharge fluid tube 24b communicated with the discharge portion. In addition, a discharging portion is the operation fluid tank or a suction portion (a portion for sucking the operation fluid) of the hydraulic pump. In addition, the discharging portion should just be a portion to which the operation fluid is discharged, and may be a portion other than the operation fluid tank and the suction portion of the hydraulic pump. Thus, the discharging portion is not limited thereto.

A throttle portion 101 is connected to the return-discharge fluid tube 100. The throttle portion 101 is configured, for example, by making a part of the return-discharge fluid tube 100 thinner than the other part.

In other words, the throttle portion 101 is configured by making the cross-sectional area of the portion through which the operation fluid flows in the return-discharge fluid tube 100 smaller than that of the other portion. The configuration of the return-discharge fluid tube 100 is not limited to the example described above.

A check valve 102 is connected to the external fluid tube 61b. The check valve 102 is a valve that allows the return fluid to flow from the first control valve 20A to the second control valve 20B, and prevents the operation fluid from flowing from the second control valve 20B to the return-discharge fluid tube 100.

In particular, in the external fluid tube 61b, the check valve 102 is arranged in a section between the first connecting portion 110 where the external fluid tube 61b and the return-discharge fluid tube 100 are connected and the second connecting portion (the first input port 42a and the second input port 42b) where the external fluid tube 61b and the second control valve 20B are connected.

Thus, when the first control valve 20A is set to the second position 20a2, the first internal fluid tube 61a and the external fluid tube 61b are communicate with each other. Thus, the return fluid from the first hydraulic actuator 14 can flow to the external fluid tube 61b through the first internal fluid tube 61a.

As described above, since the return-discharge fluid tube 100 is connected to the external fluid tube 61b, a part of the return fluid can be returned to the return-discharge fluid tube 100.

Here, when the first hydraulic actuator 14 is shortened, the quantity of the operation fluid flowing toward the second control valve 20B and the like is increased depending on the relationship between the cross-sectional areas of the rod 14b and the piston 14c, in comparison with the case where the first hydraulic actuator 14 is stretched.

Since a part of the return fluid is discharged by the discharge fluid tube 100, the quantity of operation fluid flowing to the second control valve 20B can be made substantially the same as the quantity for stretching the first hydraulic actuator 14.

In addition, since the check valve 102 is provided in the external fluid tube 61b, the operation fluid in the external fluid tube 61b can be prevented from returning to the first control valve 20A depending on the relationship between the pressure of the operation fluid in the central fluid tube 53c and the pressure of the operation fluid flowing from the external fluid tube 61b to the second control valve 20B.

As described above, in the first control valve 20A, the return fluid from the first hydraulic actuator 14 can be supplied to the second control valve 20B when the first control valve 20A is in the side position (the second position) 20a2. In addition to that, a second internal fluid tube 105 configured to connect the output fluid tube 27 and the central fluid tube 51 upon being set to the side position (the second position) 20a2.

The second internal fluid tube 105 is provided inside the first control valve 20A, and connects the third input port 46c and the third output port 41c when the first control valve 20A is in the side position (the second position) 20a2. The throttle portion 106 is connected to the second internal fluid tube 105. The central fluid tube 53c is not completely shut off when the first control valve 20A is set to the second position 20a2, and a part of the operation fluid introduced to the third input port 46c flows from the third output port 41c to the central fluid tube 51 through the central fluid tube 53c.

That is, the first control valve 20A has a neutral position 20a3 and a second position 20a2. The neutral position 20a3 allows the hydraulic fluid supplied from the output fluid tube 27 to the first control valve 20A to be supplied to the central fluid tube 51. The second position 20a2 is a side position allowing the supplied hydraulic fluid to be supplied to the first hydraulic actuator 14 and the central fluid tube and to be supplied to the second control valve 20B.

In other words, the first control valve 20A may be constituted of a valve configured not to fully close a fluid tube (the central fluid tube 53c) corresponding to the neutral position 20a3 in the case where the first control valve 20A is in the second position 20a2.

Figure 3A:
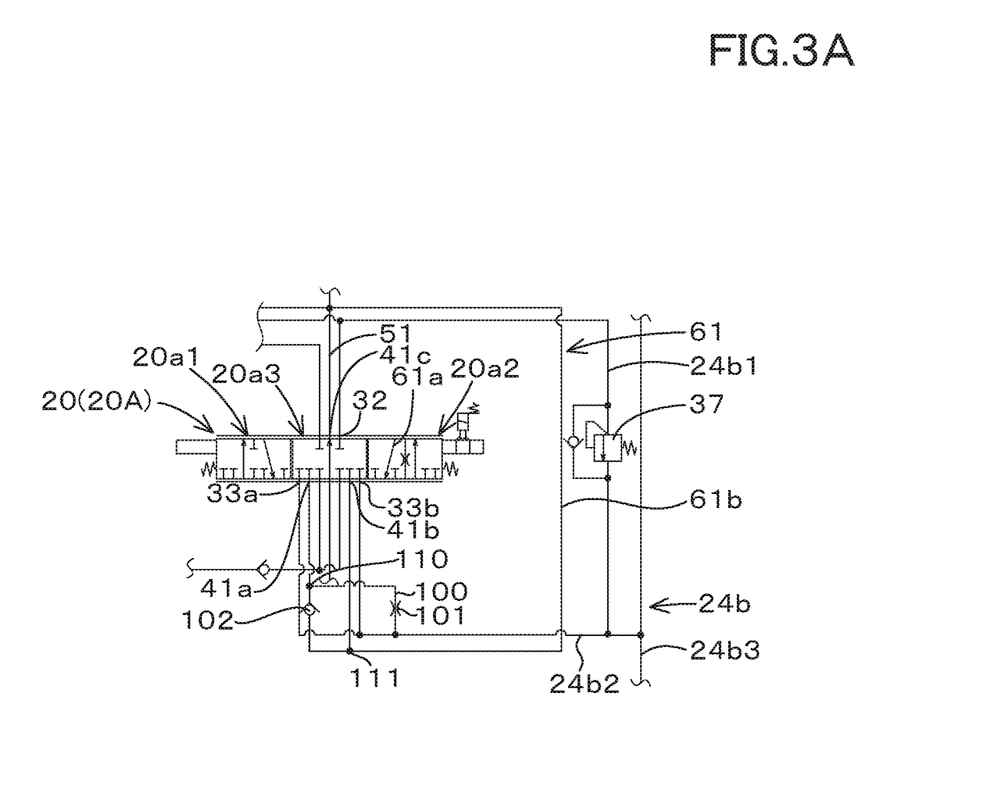
FIG. 3A is a view illustrating a first modified example of a check valve and a return discharging fluid tube according to the embodiments.

As shown in FIG. 3A, in the external fluid tube 61b, a check valve 102 may be provided on an upstream side of a confluent portion 111 where the fluid tube connected to the first output port 41a and the fluid tube connected to the second output port 41b are confluent with each other.

In that case, a return-discharge fluid tube 100 may be connected to the section in which the check valve 102 is provided, that is, the section from the first control valve 20A to the confluent portion 111 in the external fluid path 61b.

In other words, in the external fluid tube 61b, the return-discharge fluid tube 100 may be connected between the check valve 102 and any one of the first output port 41a and the second output port 41b.

Second Embodiment

Figure 2:
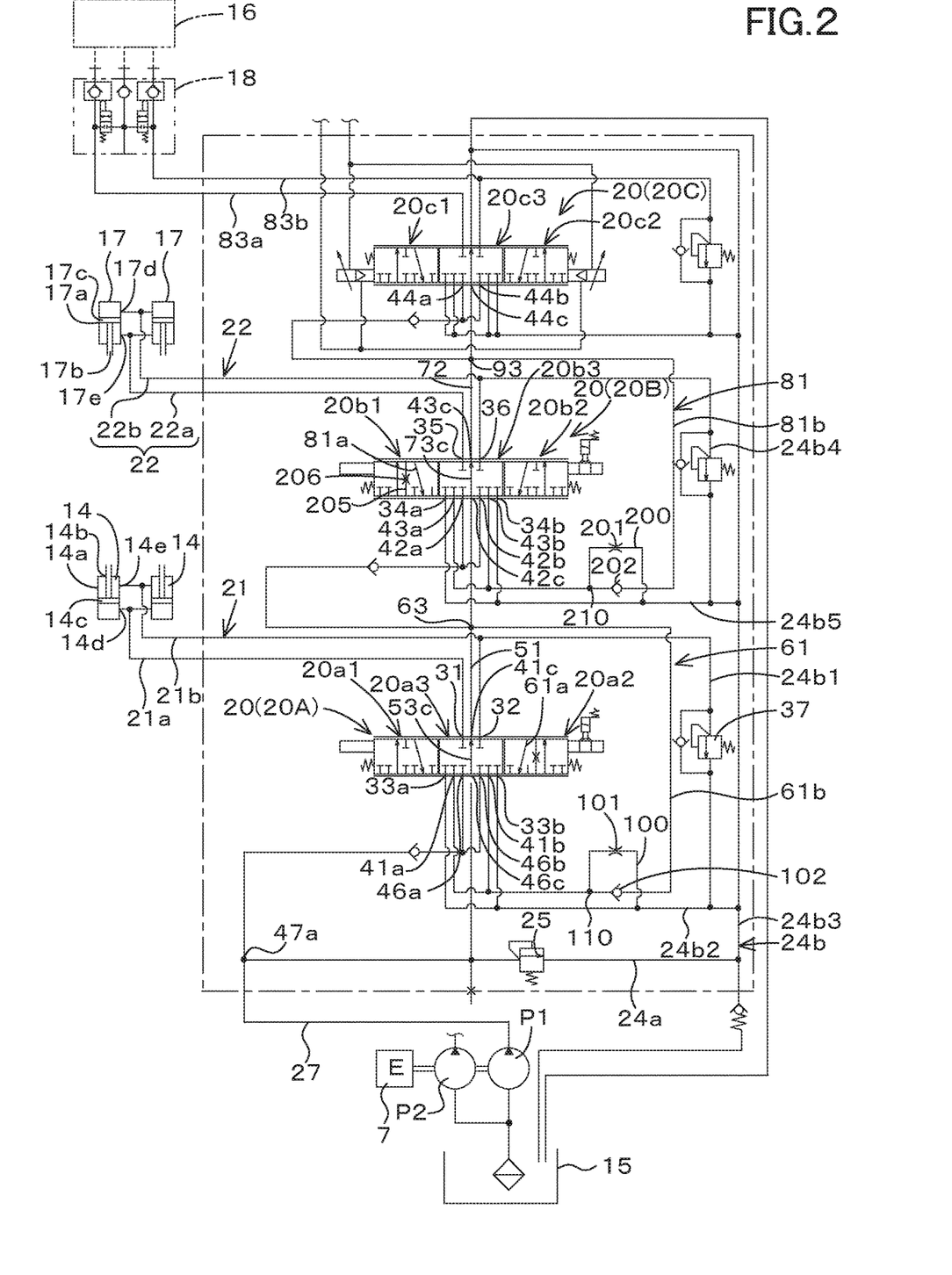
FIG. 2 is a view illustrating a hydraulic system (a hydraulic circuit) according to a second embodiment of the present invention.

FIG. 2 shows a hydraulic system (a hydraulic circuit) for the working machine according to the second embodiment. The components same as those of the first embodiment are denoted by the same reference numerals, and the description thereof will be omitted.

In the second embodiment, for convenience of the explanation, the bucket control valve 20B is referred to as a "first control valve", and the auxiliary control valve 20C is referred to as a "second control valve". In addition, the bucket cylinder 17 is referred to as a "first hydraulic actuator", and the hydraulic actuator 16 is referred to as a "second hydraulic actuator".

The first control valve 20B and the second control valve 20C are connected by a central fluid tube 72. The central fluid tube 72 connects the third output port 43c of the first control valve 20B and the third input port 44c of the second control valve 20C.

The first control valve 20B and the second control valve 20C are connected by a first fluid tube 81, separately from the central fluid tube 72. The first fluid tube 81 is a fluid tube that supplies the return fluid, which is returned from the first hydraulic actuator 17 to the first control valve 20B, to the second control valve 20C through the first control valve 20B.

The first fluid tube 81 includes a first connecting fluid tube (a first return fluid tube) 22a, a first internal fluid tube 81a, and an external fluid tube 81b. The first connecting fluid tube 22a is a fluid tube connecting the first port 35 of the first control valve 20B and the second port 17e of the first hydraulic actuator 17, that is, a first return fluid in which the return fluid discharged from the second port 17e flows.

The second connecting fluid tube (the second return fluid tube) 22b different from the first connecting fluid tube 22a is a fluid tube connecting the second port 36 of the first control valve 20B and the first port 17d of the first hydraulic actuator 17. And, the second connecting fluid tube is the second return fluid tube in which the return fluid discharged from the first port 17d flows.

The second return fluid tube 22b is connected to the discharge fluid tube 24b. The discharge fluid tube 24b includes a fluid tube (a fifth fluid tube) 24b4 connected to the second return fluid tube 22b, a fluid tube 24b5 connected to the first discharge port 34a and the second discharge port 34b of the first control valve 20B, and a fluid tube 24b3 connecting the operation fluid tank 15 and a confluent portion between the fluid tube 24b4 and the fluid tube 24b5.

The first internal fluid tube 81a is a fluid tube provided in the first control valve 20B and is in communication with the second return fluid tube 22b. In particular, the first internal fluid tube 81a is a fluid tube to connect the second port 36 of the first control valve 20B and the second output port 43b of the first control valve 20B when the first control valve 20B is set to the first position 20b1.

The external fluid tube 81b is a fluid tube that is communicated with the first internal fluid tube 81a and is connected to the second control valve 20C. The external fluid tube 81b connects the first output port 43a of the first control valve 20B and the first input port 44a of the second control valve 20C, and connects the second output port 43b of the first control valve 20B and the second input port 44b of the second control valve 20C. The middle portion of the external fluid tube 81b is connected to the central fluid tube 73c.

Also in the second embodiment, it is possible to discharge the return fluid passing through the external fluid tube 81b. The working hydraulic system includes a return-discharge fluid tube 200.

The return-discharge fluid tube 200 is a fluid tube provided on the downstream side of the spool of the first control valve 20B. The return-discharge fluid tube 200 is branched from the external fluid tube 81b and discharges, to the discharge portion, the return fluid passing through the external fluid tube 81b.

In particular, one end of the return-discharge fluid tube 200 is connected to the external fluid tube 81b, and the other end is connected to the discharge fluid tube 24b that is in communication with the discharge portion.

A throttle portion 201 is connected to the return-discharge fluid tube 200. The throttling portion 201 is configured, for example, by making a part of the return-discharge fluid tube 200 thinner than the other parts.

In other words, the throttle portion 201 is configured by making the cross-sectional area of the portion through which the operation fluid flows in the return-discharge fluid tube 200 smaller than that of the other portion. The configuration of the return-discharge fluid tube 200 is not limited to the example described above.

A check valve 202 is connected to the external fluid tube 81b. The check valve 202 is a valve that allows the return fluid to flow from the first control valve 20B to the second control valve 20C, and prevents the operation fluid from flowing from the second control valve 20C to the return-discharge fluid tube 200.

In particular, in the external fluid tube 81b, the check valve 202 is arranged in a section between the first connecting portion 210 where the external fluid tube 81b and the return-discharge fluid tube 200 are connected and the second connecting portion (the first input port 44a and the second input port 44b) where the external fluid tube 81b and the second control valve 20C are connected.

Thus, when the first control valve 20B is set to the first position 20b1, the first internal fluid tube 81a and the external fluid tube 81b are communicate with each other. Thus, the return fluid from the first hydraulic actuator 17 can flow to the external fluid tube 81b through the first internal fluid tube 81a.

As described above, since the return-discharge fluid tube 200 is connected to the external fluid tube 81b, a part of the return fluid can be discharged to the discharge fluid tube 200.

In addition, the first control valve 20B also may include a second internal fluid tube 205 configured to connect the central fluid tube 51 and the central fluid tube 72 in the case where the first control valve 20B is in the side position (the first position) 20b1.

The second internal fluid tube 205 is provided inside the first control valve 20B, and connects the third input port 42c and the third output port 43c when being in the side position (the first position) 20b1.

The throttle portion 206 is connected to the second internal fluid tube 205, and the central fluid tube 73c is not completely shut off when the first control valve 20B is set to the first position 20b1. And then, a part of the operation fluid introduced to the third input port 42c flows from the third output port 43c to the central fluid tube 72 through the central fluid tube 73c.

That is, the first control valve 20B is configured to be switched between a neutral position 20b3 allowing the supply fluid supplied to the first control valve 20B to be supplied to the central fluid tube 72 and a first position 20b1 that is the side position allowing the supply fluid to be supplied to the second hydraulic actuator 17 and the central fluid tube 72 and to flow to the second control valve 20C.

In other words, the first control valve 20B may be a valve configured not to fully close the fluid tube (the central fluid path 73c) corresponding to the neutral position 20b3 when the first control valve 20B is in the first position 20b1.

Figure 3B:
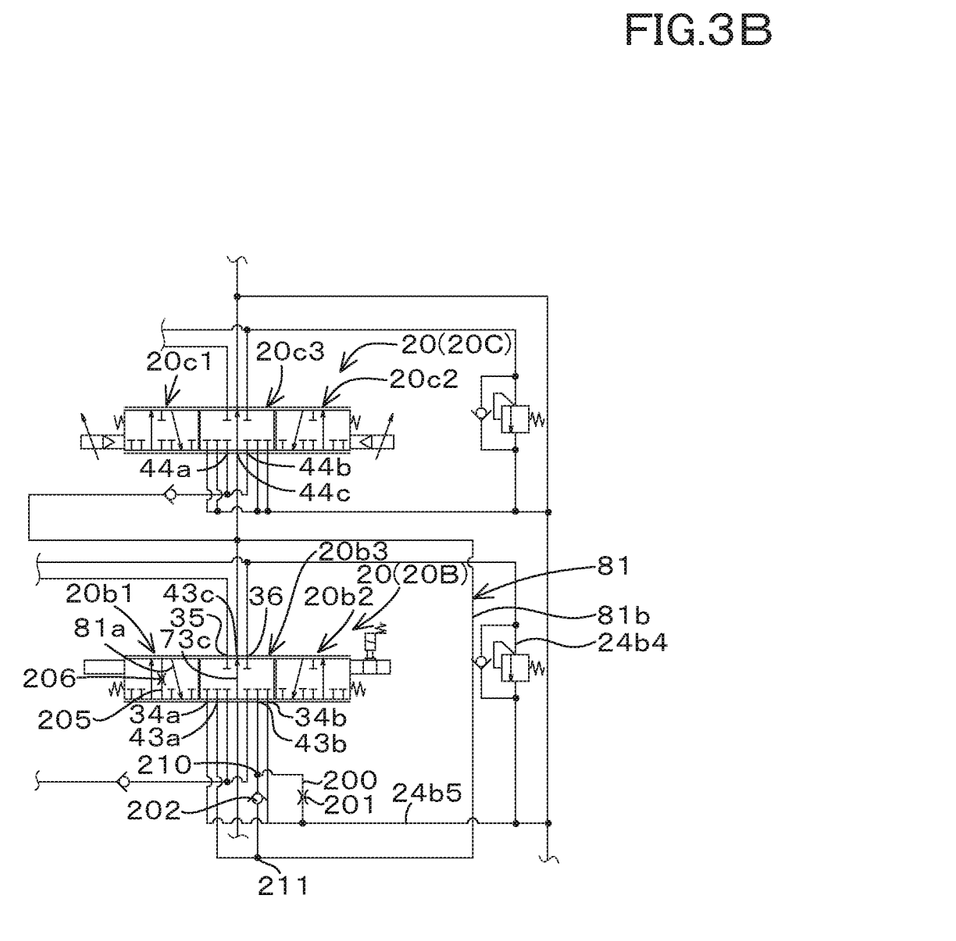
FIG. 3B is a view illustrating a second modified example of the check valve and the return discharging fluid tube according to the embodiments.

As shown in FIG. 3B, in the external fluid tube 81b, a check valve 202 may be provided on the upstream side of the confluent portion 211 between the fluid tube connected to the first output port 43a and the fluid tube connected to the second output port 43b.

In that case, in the external fluid tube 81b, the return-discharge fluid tube 200 may be connected to a section from the first control valve 20B to the confluent portion 211, that is, a section provided with the check valve 202.

In other words, in the external fluid tube 81b, the return-discharge fluid tube 200 may be connected between the check valve 202 and any one of the first output port 43a and the second output port 43b.

In addition, the modified example of connection between the check valves 102 and 202 and the return-discharge fluid tubes 100 and 200 is explained in FIGS. 3A and 3B. However, all combinations in the above-described embodiment can be adopted to the connection structure between the check valves 102 and 202 and the return-discharge fluid tubes 100 and 200.

Figure 4A:
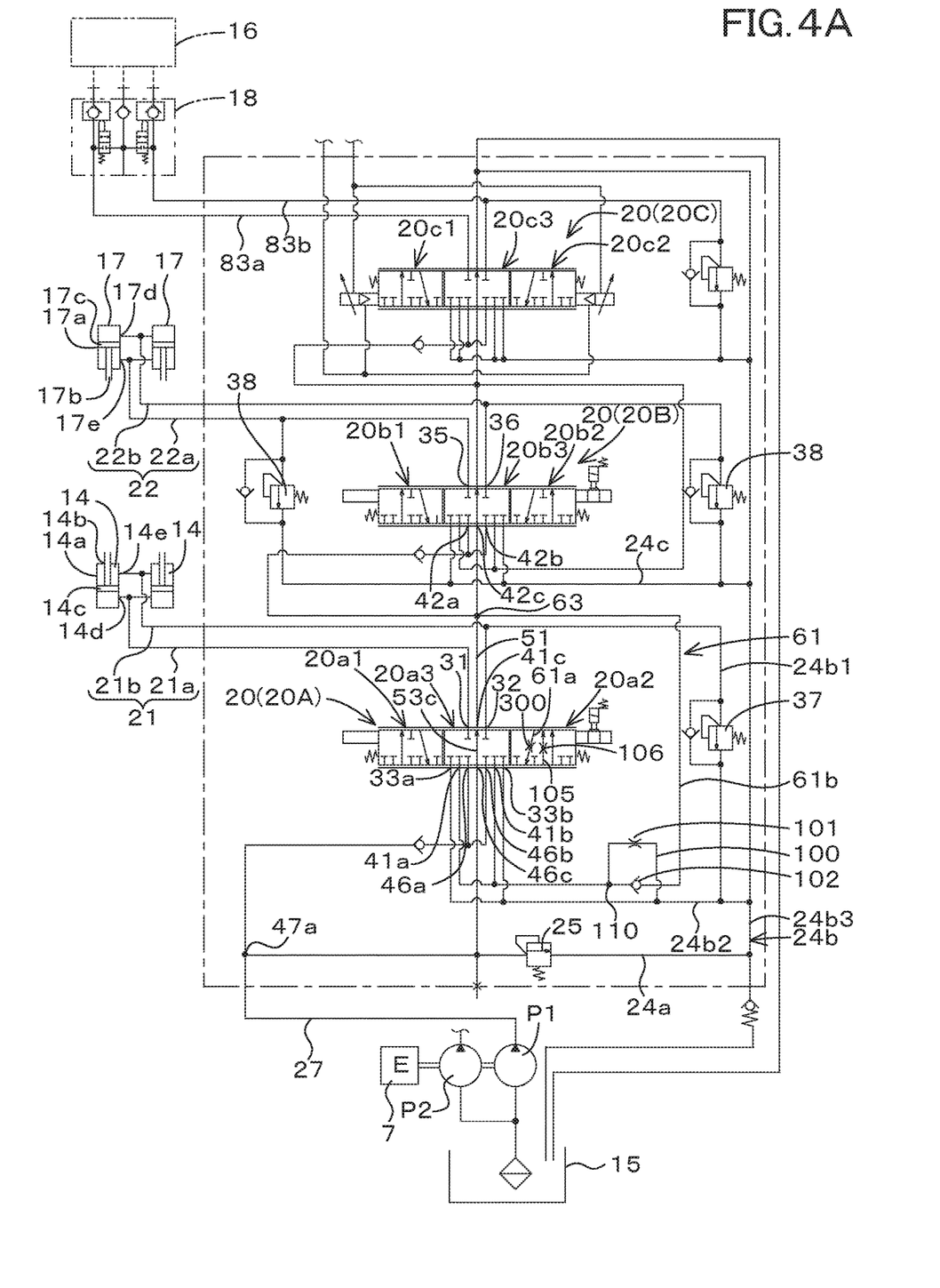
FIG. 4A is a view illustrating a third modified example of the hydraulic system according to the embodiments.

FIG. 4A is a view showing a third modified example of the hydraulic system. As shown in FIG. 4A, the first internal fluid tube 61a of the first fluid tube 61 is provided with a throttle portion 300. The opening area of the throttle portion 300 is larger than the opening area of the throttle portion 101 of the return-discharge fluid tube 100.

In other words, the opening area of the throttle portion 101 of the return-discharge fluid tube 100 is smaller than the opening area of the throttle portion 300 of the first internal fluid tube 61a. By making the opening area of the throttle portion 101 smaller than the opening area of the throttle portion 300 of the first internal fluid tube 61a, the pressure of the operation fluid on the external fluid tube 61b side can be maintained high.

In addition, the opening area of the throttle portion 101 of the return-discharge fluid tube 100 is larger than the opening area of the throttle portion 106 provided in the second internal fluid tube 105. That is, focusing on the opening areas of the throttle portion 300, the throttle portion 101, and the throttle portion 106, the aperture area of the throttle portion 300 is larger than the aperture area of the throttle portion 101, and the aperture area of the throttle portion 101 is larger than the aperture area of the throttle portion 106.

Figure 4B:
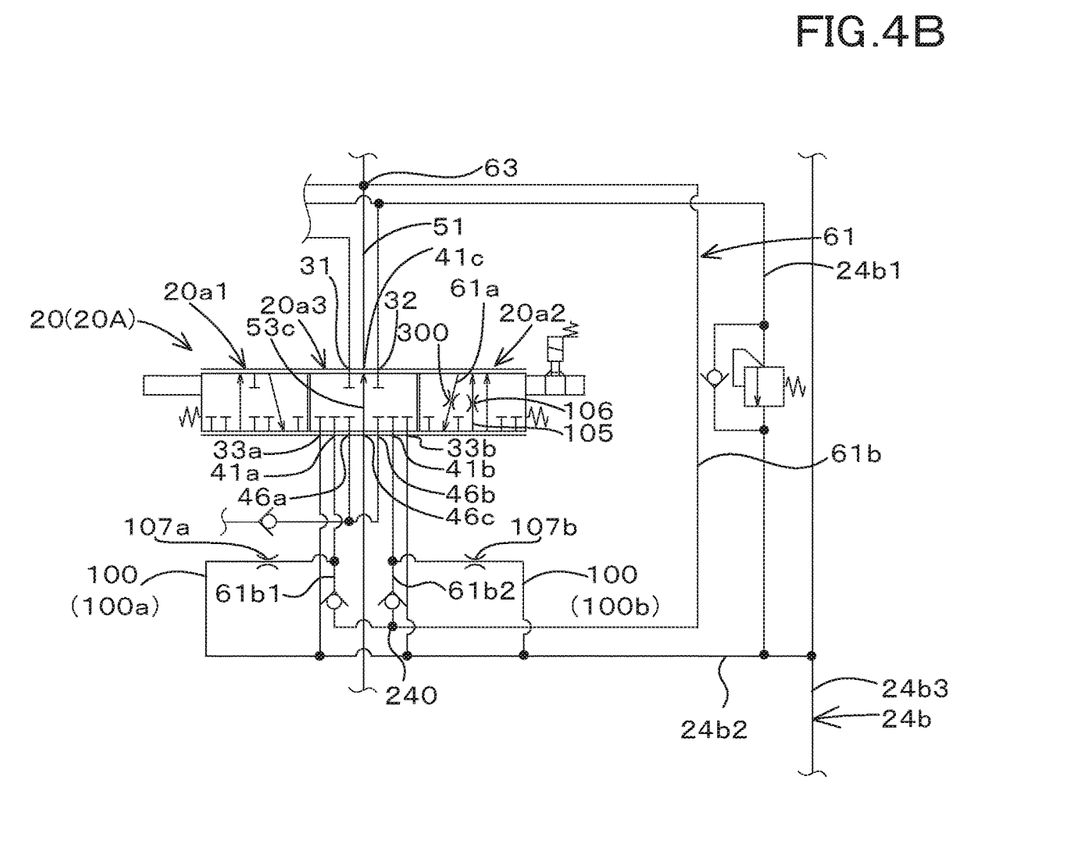
FIG. 4B is a view illustrating a fourth modified example of the hydraulic system according to the embodiments.

FIG. 4B is a view showing a fourth modified example of the hydraulic system. As shown in FIG. 4B, a plurality of return-discharge fluid tubes 100 are connected to the external fluid tube 61b. The return-discharge fluid tubes 100 include a first discharge fluid tube 100a and a second discharge fluid tube 100b.

One end of the first discharge fluid tube 100a is connected to the section 61b1 from the first output port 41a to the connecting portion 240 in the external fluid tube 61b. One end of the second discharge fluid tube 100b is connected to the section 61b2 from the second output port 41b to the connecting portion 240 in the external fluid tube 61b. The other end of the first discharge fluid tube 100a and the other end of the second discharge fluid tube 100b are connected to the discharge fluid tube 24b.

The first discharge fluid tube 100a is provided with a throttle portion 107a for reducing the flow rate of operation fluid, and the second discharge fluid tube 100b is also provided with a throttle portion 107b for reducing the flow rate of operation fluid. The opening area of the throttle portion 107a is larger than the opening area of the throttle portion 107b.

That is, the flow rate of the operation fluid (a cylinder return flow rate) returning from the first hydraulic actuator 14 to the external fluid tube 61b when the first control valve 20A is switched to the first position 20a1 and thereby the boom 10 is moved upward is smaller than the flow rate of the operation fluid (a cylinder return flow rate) returning from the first hydraulic actuator 14 to the external fluid tube 61b when the first control valve 20A is switched to the second position 20a2 and thereby the boom 10 is moved downward.

Since the opening area of the throttle portion 107b on the side where the cylinder return flow rate is reduced when the boom 10 is moved upward and downward is smaller than the opening area of the throttle portion 107a on the side where the operation fluid is increased, the pressure can be made constant, and the boom 10 can be operated stably.

Figure 4C:
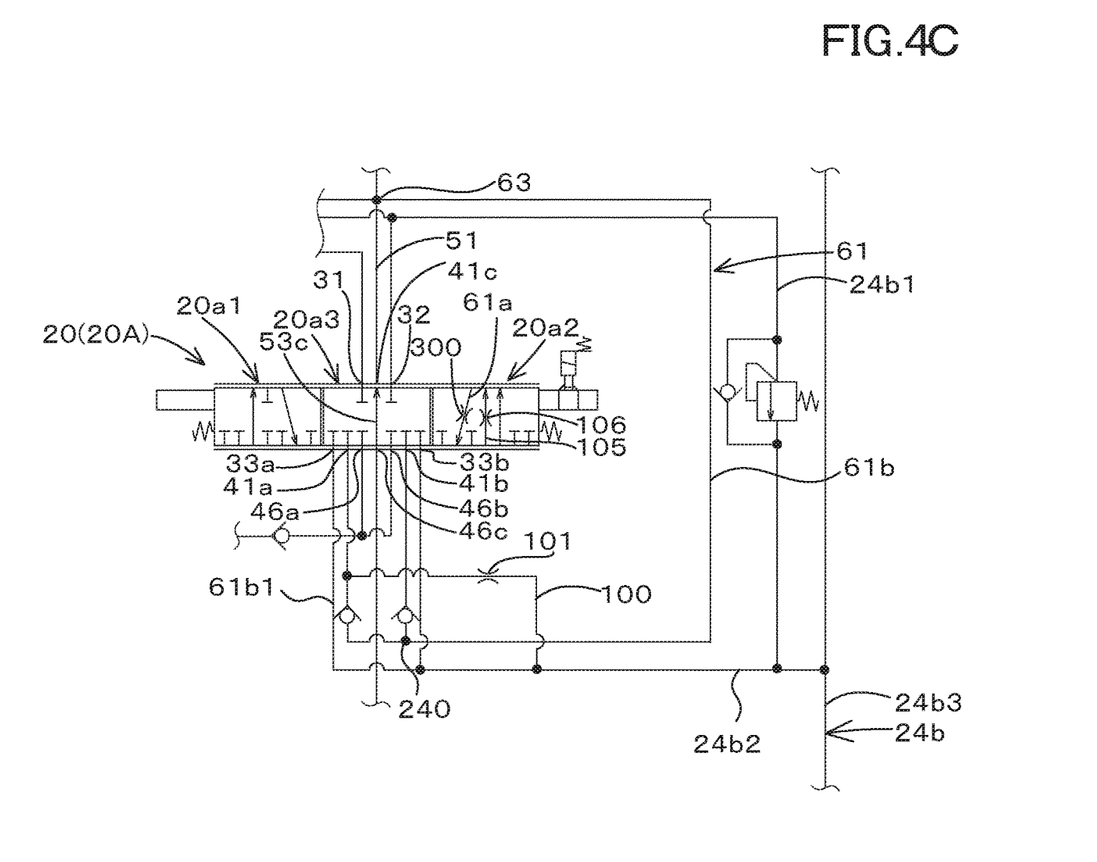
FIG. 4C is a view illustrating a fifth modified example of the hydraulic system according to the embodiments.

FIG. 4C is a view showing a fifth modified example of the hydraulic system. As shown in FIG. 4C, one end of the return-discharge fluid tube 100 is connected to the section 61b1 from the first output port 41a to the connecting portion 240 in the external fluid tube 61b, and the other end of the return-discharge fluid tube 100 is connected to the discharge fluid tube 24b.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

The first control valve and the second control valve are not limited to the configurations according to the above-described embodiments, and any control valve provided in the working machine may be employed. In the embodiments described above, the hydraulic pump is a constant displacement pump. However, the hydraulic pump may be a variable displacement pump whose output rate is varied depending on movement of the swash plate or may be another type of the hydraulic pump, for example.

What is claimed is:

1. A hydraulic system for a working machine, comprising:
a hydraulic pump to output an operation fluid;
a first hydraulic actuator;
a second hydraulic actuator;
a first control valve to control the first hydraulic actuator, the first control valve having an output port;
a second control valve to control the second hydraulic actuator, the second control valve being arranged on a downstream side of the first control valve;
a return fluid tube in which a return fluid discharged from the first hydraulic actuator flows, the return fluid tube connecting the first control valve and the first hydraulic actuator;
a first inner fluid tube provided in the first control valve and connected to the return fluid tube;
an outer fluid tube connected to the first inner fluid tube through the output port, the outer fluid tube connecting and extending between the output port of the first control valve and the second control valve;
a return-discharge fluid tube provided outside the first control valve to discharge the return fluid, the return-discharge fluid tube being branched from the outer fluid tube; and
a throttle provided in the return-discharge fluid tube.

2. The hydraulic system according to claim 1, comprising a check valve to allow the return fluid to flow from the first control valve toward the second control valve and to prevent the operation fluid to flow from the second control valve to the return-discharge fluid tube, the check valve being provided in the outer fluid tube.

3. The hydraulic system according to claim 2, wherein the check valve is provided in a section of the outer fluid tube between a first connecting portion connecting the outer fluid tube and the return-discharge fluid tube and a second connecting portion connecting the outer fluid tube and the second control valve.

4. The hydraulic system according to claim 3, comprising a center fluid tube through which a supply fluid flows separately from the outer fluid tube, the center fluid tube connecting the first control valve and the second control valve, the supply fluid being the operation fluid outputted from the hydraulic pump,
wherein the first control valve has:
a neutral position to allow the supply fluid to be supplied to the center fluid tube; and
a side position to allow the operation fluid to be supplied to the first hydraulic actuator and to connect the first inner fluid tube and the outer fluid tube,
the first control valve being switched between the neutral position and the side position.

5. The hydraulic system according to claim 4, comprising a second inner fluid tube to be connected to the center fluid tube when the first control valve is in the side position.

6. The hydraulic system according to claim 2, comprising a center fluid tube through which a supply fluid flows separately from the outer fluid tube, the center fluid tube connecting the first control valve and the second control valve, the supply fluid being the operation fluid outputted from the hydraulic pump,
wherein the first control valve has:
a neutral position to allow the supply fluid to be supplied to the center fluid tube; and
a side position to allow the operation fluid to be supplied to the first hydraulic actuator and to connect the first inner fluid tube and the outer fluid tube, the first control valve being switched between the neutral position and the side position.

7. The hydraulic system according to claim 6, comprising a second inner fluid tube to be connected to the center fluid tube when the first control valve is in the side position.

8. The hydraulic system according to claim 1, comprising a center fluid tube through which a supply fluid flows separately from the outer fluid tube, the center fluid tube connecting the first control valve and the second control valve, the supply fluid being the operation fluid outputted from the hydraulic pump, wherein the first control valve has:
  a neutral position to allow the supply fluid to be supplied to the center fluid tube; and
  a side position to allow the operation fluid to be supplied to the first hydraulic actuator and to connect the first inner fluid tube and the outer fluid tube, the first control valve being switched between the neutral position and the side position.

9. The hydraulic system according to claim 8, comprising a second inner fluid tube to be connected to the center fluid tube when the first control valve is in the side position.

* * * * *